United States Patent [19]
Kunzelman et al.

[11] Patent Number: 6,041,357
[45] Date of Patent: Mar. 21, 2000

[54] COMMON SESSION TOKEN SYSTEM AND PROTOCOL

[75] Inventors: Kevin Kunzelman, San Francisco; Sterling Hutto, Sausalito, both of Calif.

[73] Assignee: Electric Classified, Inc., San Francisco, Calif.

[21] Appl. No.: 08/796,260

[22] Filed: Feb. 6, 1997

[51] Int. Cl.[7] .............................. H04L 9/00; G06F 13/14
[52] U.S. Cl. .............................. 709/228; 380/49; 380/25; 395/187.01
[58] Field of Search .............................. 395/186, 187.01, 395/188.01, 200.48, 200.59, 200.33, 200.57; 380/49, 25

[56] References Cited

U.S. PATENT DOCUMENTS

| | | | |
|---|---|---|---|
| 5,224,163 | 6/1993 | Gasser et al. | 380/30 |
| 5,542,046 | 7/1996 | Carlson et al. | 395/186 |
| 5,689,638 | 11/1997 | Sadovsky | 395/188.01 |
| 5,706,349 | 1/1998 | Aditham et al. | 380/257.01 |
| 5,708,780 | 1/1998 | Levergood et al. | 395/200.59 |
| 5,740,242 | 4/1998 | Minor et al. | 380/49 |
| 5,774,670 | 6/1998 | Montulli | 395/200.57 |

OTHER PUBLICATIONS

Yoshida, H.; "The Age of Customized Web Site", *Web Developer* (Winter 1996) Tech Spotlight, located at http://W3.COM/CGI–BIN/W3 CPM/PWS/W3 . . . JhbIdxBW_F92–XXfDgM–wZ8WxcC1mT666J, pp. 1–5.

"IETF Hypertext Transfer Protocol (HTTP) Working Group" located at http://www.ecs.uci.edu/pub/ietf/http/, pp. 1–5.

A. Hutchinson, et al., "An Extension of the HTTP Authentication Scheme to Support Server Groups", located at http://www.ics.uci.edu/pub/ietf/ht ft–trommler–http–ext–groups–00.txt, pp. 1–10.

P.M. Hallam–Baker, et al., "Session Identification URI", located at http://www.es.net/pub/internet–drafts/draft–ietf–http–session–id–00.txt, pp. 1–10.

D.M. Kristol, et al., "Proposed HTTP State Management System", located at http://www.research.att.com/~dmk/cookie–2.9.txt, pp. 1–17.

*Primary Examiner*—Pinchus M. Laufer
*Attorney, Agent, or Firm*—Philip H. Albert; Townsend and Townsend Crew

[57] ABSTRACT

An improved session control method and apparatus includes a client which establishes a session with a first server such that the first server can identify the client. When the client wishes to migrate from the first server to a second server, the client requests a session token from the first server. The session token is a data element generated by the first server which is unique over the client-server network being navigated and identifies the particular session with the first server. The session token is preferably a difficult to forge data element, such as a data element digitally signed using the private key of the first server. The session token is passed from the client to the second server to initiate migration to the second server. If session data is too bulky to be passed as part of the session token, the second server may use data from the session token to formulate a request to the first server for additional data needed to handle the state of the session. To minimize the transmission of data, the second server might maintain a version of the bulk session data and only request an update to the version of the data indicated in the session token.

13 Claims, 3 Drawing Sheets

COMMON SESSION TOKEN SYSTEM AND PROTOCOL

BACKGROUND OF THE INVENTION

The present invention relates to the field of client-server protocols. More specifically, one embodiment of the invention provides for seamless migration of a session from one independent cooperating server node to another.

The global Internet has emerged as a model of a distributed network of networks. One application for which the Internet is increasingly used is to interconnect hypertext transfer protocol (HTTP) servers to clients. The hypertext transfer protocol is used to serve documents containing hypertext references to client "browsers" on client systems connected to the Internet. The documents served by an HTTP server will often have hypertext references embedded in the document which refer to documents on the HTTP server or documents on a completely different server. With such an arrangement, millions of documents have been linked to form the World Wide Web, which is an allusion to the fact that these hypertext links might look like a spider web if a diagram of the documents and the links were drawn.

Hypertext, as such, was used in other contexts, such as help documentation, but those uses generally connected to a central document repository or even a single file with references to locations internal to the file. What made the World Wide Web more interesting and complex is the fact that a link in a first document stored on a first server might refer to a document on a second server where the author of the first document and the system operator of the first server had no editorial or system control over the second document or the second server.

This independence of servers did not inhibit the navigation of a client from server to server, since the reference for the link to be followed was fully contained in the document where the reference was made. These self-contained references to information are referred to as "uniform resource locators" (URLs) because the reference was all that was needed to locate the "linked-to" document. Since the URL is a static data element, it is the same for every client, so the linked-to server could not identify who the client was. Several solutions to this shortcoming have been in common use.

The most common solution is to eliminate the need to know who the client is. If the identity of the client is not needed, an HTTP server will serve documents to any client which requests a page. Of course, this solution is only practical where the author of the linked-to document does not want to place any restrictions on who may view the page. If the author of the linked-to page wants to place restrictions, the client will have to enter into a "session" with the server where the client is first authenticated prior to the server allowing access to the server.

One consequence of such an architecture is that, without some session control, the clients and servers must operate in a "stateless" manner, i.e., not tracking client identity, or any other variables, from request to request. Session control, when used, is usually done by a server requesting a login name and a password from the client prior to serving documents. Where all the documents are stored on a single server or a centrally controlled cluster of servers, session control only need occur when the client first visits the server. If a link from one document references a document on the same server, the session can be seamlessly continued from the perspective of the client. However, if the link is to a document on a second server not commonly controlled with the first server, the second server will interrupt the navigation process to require authorization information from the client. The usefulness of hypertext documents is greatly diminished if a user must enter a new login name and password each time a link is taken.

Session control for a single document is known. A URL for a document available in a sessionless environment might be a character string of the form:

http://server.host.domain/directory/subdir/file with "http://" indicating the protocol, "server.host.domain" uniquely identifying the server, and "directory/subdir/file" identifying the document to be served. Where the document is not to be accessible to other than an authorized client, the URL might be of a form similar to the sessionless URL:

http://server.host.domain/dir...file?userfred+password

In the session-specific URL, the user's name and password are included in the URL. While this is useful for making a reference to a single document for a specific user, it is not useful for passing sensitive session information because, the user name and password being in plaintext, it is too easily tampered with.

Thus, what is needed is a method and apparatus for maintaining a seamless and secure migration of a session between a client and a first server to a session between the client and a second server, where the first and second servers are independently controlled.

SUMMARY OF THE INVENTION

An improved session control method and apparatus is provided by virtue of the present invention. In one embodiment of the present invention, a client establishes a session with a first server such that the first server can identify the client. When the client wishes to migrate from the first server to a second server, the client requests a session token from the first server. The session token is a data element generated by the first server which is unique over the client-server network being navigated and identifies the particular session with the first server. The session token is preferably a difficult to forge data element, such as a data element digitally signed using the private key of the first server and possibly encrypted. The session token might also be encrypted, using public key encryption or other methods, to prevent the session token from being easily readable.

The session token is passed from the client to the second server to initiate migration to the second server. In some embodiments, session data is too bulky to be passed as part of the session token. In such cases, the second server uses the session token to formulate a request to the first server for the data needed to handle the state of the session and the first server provides the data to the second server. To minimize the transmission of data, the second server might maintain a version of the bulk session data and only request an update to the version of the data indicated in the session token.

In the preferred embodiment, the token is passed in a URL (Uniform Resource Locator). However, it also might be passed as an HTTP "cookie".

A further understanding of the nature and advantages of the inventions herein may be realized by reference to the remaining portions of the specification and the attached drawings.

DESCRIPTION OF THE PREFERRED EMBODIMENTS

Figure 1:
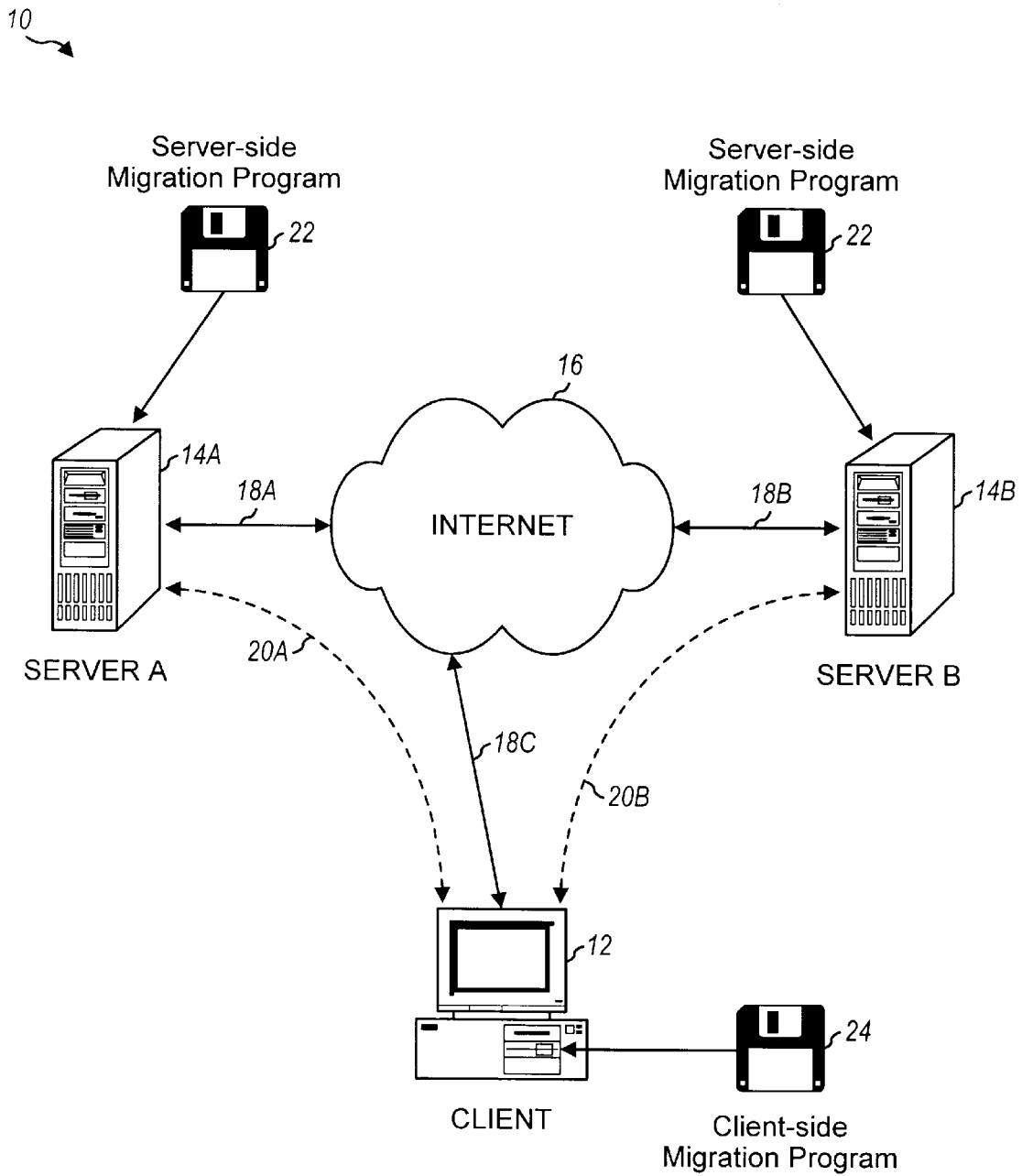
FIG. 1 is a block diagram of a client-server network with which the present invention is used.

FIG. 1 illustrates an overall structure of a client-server network 10 with which the present invention is used. Network 10 is shown comprising a client 12, two servers 14A, 14B, the Internet 16, server connections 18A, 18B to Internet 16 and a client connection 18C to Internet 16. As should be apparent, more than two servers might be coupled by a network to one or more clients, and the network need not be the global Internet, but can be any other network of cooperating independent servers. One alternative platform for the present invention is an intranet rather than Internet, where the intranet is an internal network within an organization using Internet protocols to communicate internal data. Depending on the size of the organization, the intranet might comprise several cooperating, but independent servers.

In operation, server 14A interacts with client 12 via Internet 16 by sending and receiving data packets directed at, and received from, client 12. Client 12 also sends packets to and receives packets from server 14A via Internet 16. Thus, at a network level higher than the transport level, there exists a logical channel 20A connecting client 12 to server 14A. The equivalent can be said about server 14B, which connects to client 12 via a logical channel 20B.

Server 14A and 14B are cooperative servers in that they both understand that client 12 might migrate from one server to another and facilitate that process. Unlike a centralized access control system, however, servers 14A and 14B are separately controlled.

An example of session migration will now be described with reference to a migration of client from a server A to a server B, which might be client 12, server 14A (source server node) and server 14B (target server node). The session migration process begins when client 12 takes an action which is to result in a session migration. The session migration moves the client's interaction from channel 20A to channel 20B in a way that is transparent to the client's user, but that also maintains any necessary state, including state variables which indicate a level of authorization for the client's use of the session.

One instance where migration is useful is where an operator of a Web server wants to out source the operation of a particular aspect of their Web site. For example, a newspaper might operate a site which provides news, features and classifieds, but will out source the management of the classifieds to another operator, such as Electric Classifieds, Inc., of San Francisco, Calif. (the assignee of the present application). A migration occurs when a user selects a classifieds "button" or selection on a Web page operated by the newspaper. The URL associated with the button can either be a direct reference to the target server or a reference which causes redirection. In the former case, the page containing the button is presented to the user with the underlying HTML anchor including a session token for use in migration. This is possible where the source server can anticipate that a migration may occur. In the latter case, the server need not anticipate the migration and the anchor for the button will be a URL directed at the source server. The source server responds to the URL with a redirection URL. The redirection URL would be the equivalent to the embedded URL with a session token in the former case.

Figure 2:
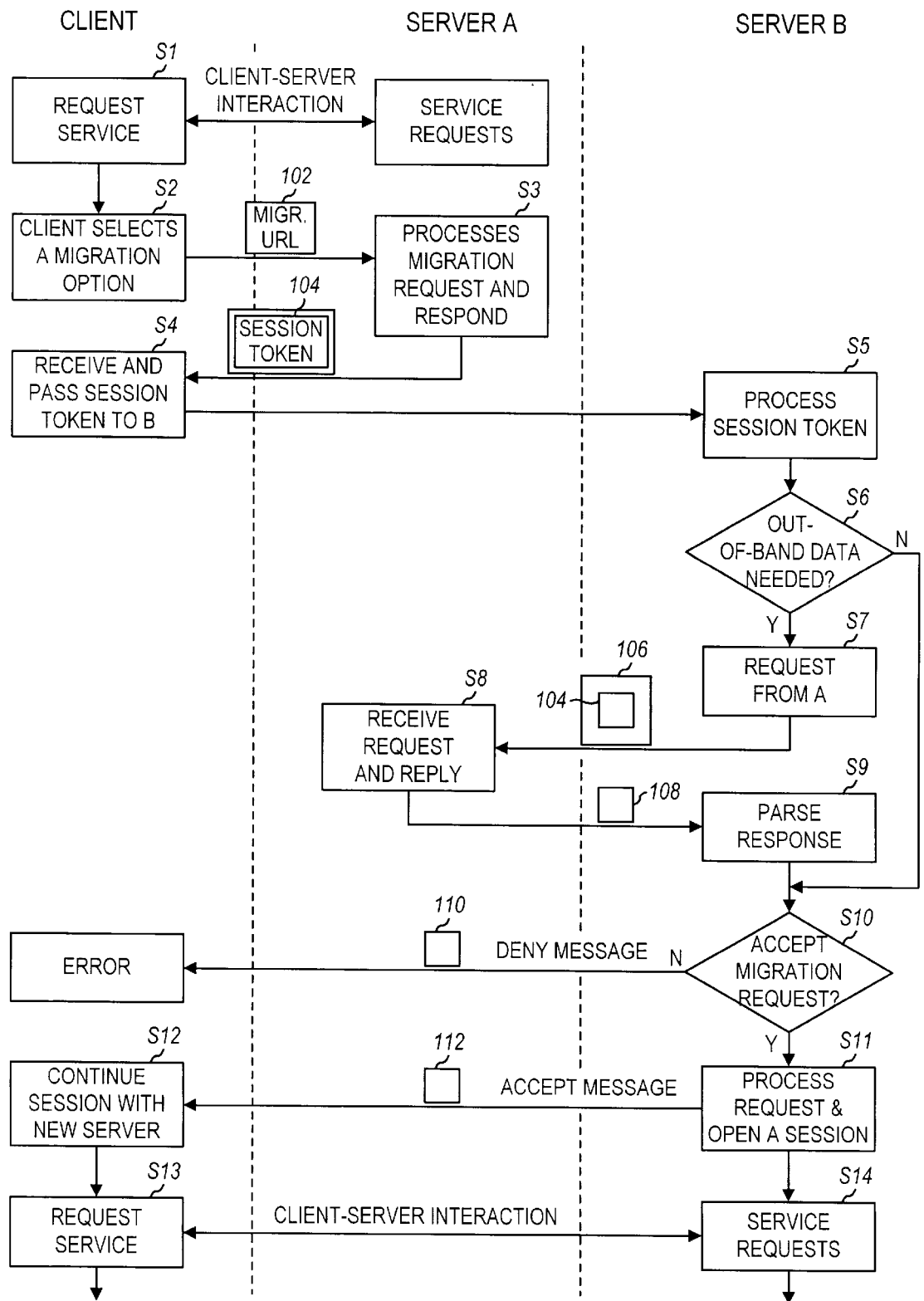
FIG. 2 is a flowchart of a session migration process according to the present invention.

A session migration using a redirection URL is illustrated in the flowchart of FIG. 2. FIG. 2 shows a number of steps identified as S1, S2, S3, etc. which are performed in ascending numerical order unless otherwise indicated. Before the migration process begins, the client is in a session with server A (step S1). The client sends requests to server A and server A services those requests. How server A services those requests depends on what the request is and the current state of the session. For example, for some requests, server A will only respond to the request if the state of the session with the client indicates that the client is logged in as an authorized user. The state might also include variables which modify the interaction with the client, such as the client's user's demographics. If the demographics indicate the geographic location of the user or the users age, gender, etc., the server might modify advertisements presented to the client accordingly. If the demographics indicate that the user is a sophisticated user, the server might send less help text in exchange for quicker transmission times. When such state variables are used, it should be apparent from this description that the server to which the client is migrating needs to have the same state variables so as to present a consistent style across the migration. State variables might also indicate what actions the client has already done, to allow for activity tracking and caching. Activity tracking is useful for Web browser clients, so that the navigation of the client can be tracked. Caching is useful for many types of clients and might be used to avoid sending data the server knows the client already has.

In step S2, the client makes a selection which server A determines will be migrated. In the case of embedded migration (not shown), server A would have anticipated the possible migration and included the migration information in an HTML anchor on the page. Server A optionally verifies if the client is permitted to migrate and then server A returns (step S3) a session token 104 to the client as part of a URL. By including the session token as part of the URL, a standard browser (i.e., one which is not aware of migration capabilities) can be used. The structure of a session token is shown in Table 1 and illustrated in FIG. 3.

TABLE 1. SESSION TOKEN ELEMENTS

1. Server Node Identifier
2. Unique Session Identifier for the Server Node
3. Time of session creation
4. Expiration (Time-to-live) of session
5. User ID
6. E-mail address
7. Telephone number
8. Postal address
9. Digital Signature The server node identifier can be almost any type of identifier, including numerical values or ASCII strings. The server node identifier might be an identifier specific to cooperating servers or could be a unique code already in use by the server such as its four-byte IP address or six-byte IP6 address. The only requirement is that no two cooperating server nodes share the same identifier. The session is uniquely identified by the first two elements in the session token, since the second element is unique within the source server node. By dividing the session identifier into two pieces, we allow for the decentralized generation of session identifiers. Some of the session token elements, such as the e-mail address, telephone number and postal address, might be optional elements.

Figure 3:
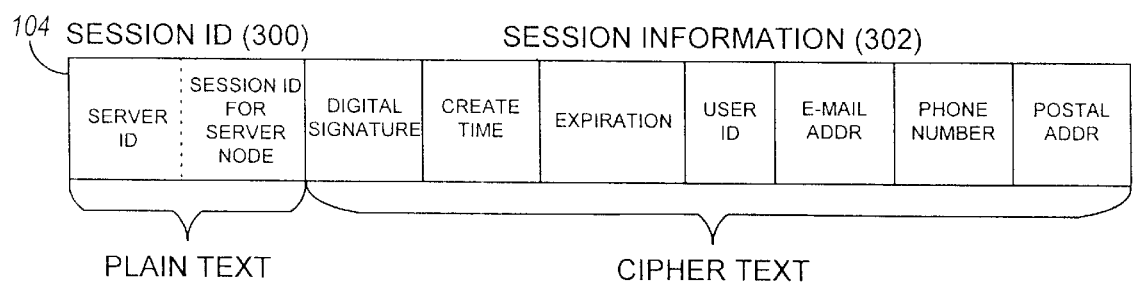
FIG. 3 is a schematic of a session token.

As shown in FIG. 3, a session token such as session token 104 is divided into a plaintext portion 300 containing the session ID and a ciphertext portion containing the encrypted session information 302 to allow for more secure transport of session token information. With public key encryption, the information can be made secure by digitally signing it, to prevent forgery, or by encrypting it, to prevent forgery and to prevent others from reading the session data. In Table 1, the encrypted session information is the third through eighth elements, which are not required to uniquely identify the session. Therefore, these fields can be sent encrypted yet be decrypted at the target server node using an encryption method and key specific to the session. If the encryption method and key is the same for all session tokens from a particular source server node, the second element can also be encrypted. Encryption of the session specific information is preferred, so that unauthorized parties cannot view the information. In some embodiments, the information in the session token is not readable by the client even when the client is in possession of the session token. Of course, the user might be able to view his or her own session information through the use of a dummy server. A dummy server accepts the user's migration like any other server, but then does nothing more than display the session information.

Table 1 shows but one example of a format for a session token. After reading this description, the person of ordinary skill will understand that other formats are possible, so long as the format have certain properties. For example, session tokens must be unique so as to uniquely identify a session and must be such that they can be generated in a distributed environment, i.e., without a centralized session token generator. They should be difficult for unauthorized parties to modify or forge. They must also be able to pass information about the session, or at least refer to information about the session, which may then later be transferred out-of-band. While the system may operate without digital signatures, the use of digitally signed session tokens is preferred. A digitally signed session token is signed using the source server node's private key so that the digital signature can be verified using the source server node's public key. Using a digital signature allows the authenticity of the token to verified.

Figure 4:
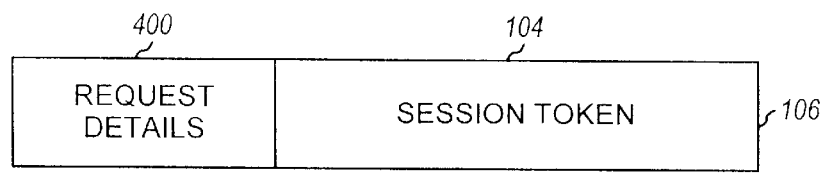
FIG. 4 is a schematic of a request for out-of-band data.

Once the client receives the session token from server A, the client sends session token 104 to the target server node, server B (step S4). Server B processes session token 104 (S5), performing the necessary verification and decrypting of the session token. In some cases, the session token makes reference to "out-of-band" data, i.e., data which is not contained within the session token but which is state information needed for migration. Out-of-band data is used to keep session tokens from being too large, or for tighter access control. For example, the user's postal address might be specified as a pointer to a specific record of a database controlled by server A. Server B checks to determine if out-of-band data is needed (S6). If out-of-band data is needed, server B forms a request 106 for the data using session token 104 and sends request 106 to server A (S7). Session token 104 is part of the request so that server A can verify that server B is making an authorized request. FIG. 4 shows the structure of request 106, which is an envelope containing request details 400 and the session token 104. In some embodiments, not all the session information is passed to the source server node.

When server A receives request 106, it supplies the out-of-band data to server B (S8) in a response 108. Server B parses and stores response 108 (S9) and proceeds to step S10. If out-of-band data is not needed, server B proceeds directly from step S6 to step S10. At step S10, server B decides whether to accept the server migration request represented by session token 104. If server B decides not to honor the migration because the identified client is not authorized to use server B, server B does not support that particular migration, or any other reasons, server B sends an error message 110 back to the client. Otherwise, server B processes the information in session token 104 and out-of-band data 108, if used, and sends an acceptance message 112 to the client (S11). Acceptance message 112 can either be a server to client message or a server to user message such as a welcome message. In the former case, the transition might be a transparent transition. The client responds (S12) by transitioning to the new session and requesting services from server B (S13) which server B services using the migrated state information (S14).

Versioning

To minimize the retransmission of data that a target server node already has, the target server node may choose to cache out-of-band data obtained from a source server node. Of course, in a distributed network, cache consistency can be a problem. Cache inconsistencies might occur when session information changes and a client is not connected to the target server node caching the data. It is important for those changes to work their way around to other server nodes.

A method for doing this is to encode a version identifier within the session token such that whenever any out-of-band type session information changes, the source server node will change the version identifier. Then, whenever a new session token is generated by the source server node, the new version identifier will be passed on to a target server node. If the version identifier within the token indicates that other information newer than the data that the target server node previously has used, the target server should request new out-of-band session information from the source server node.

Different granularities of version numbers may be used for out-of-band session information. For example, a single version number may represent the state of all out-of-band data items, or multiple version numbers may represent certain subsets of the out-of-band data. The granularity does not affect the cache updating per se. Instead, the granularity of versioning merely determines how much data must be re-transferred in the case of the change of session information.

One application for the present invention is within the World Wide Web, where session tokens are encoded within URLs. When a session is to be migrated from a source server node to a target server node, a new URL will be generated for a session token. A client application will then make a request to the target server node using this URL. The target server node will then decode this session token, verify its authenticity (using public key cryptography) and obtain any necessary out-of-band session information before continuing with the request. Preferably, the session token is limited in size so that most browsers and HTTP handlers can correctly process the session token as a URL. A limit many browsers have for URLs is 1 kilobyte. If the session information is greater than the limit, some of the session information is sent as out-of-band data.

In the preferred embodiment, the encoded session token will be in a modified Base-64, which is a standard encoding for MIME email documents (Multipurpose Internet Mail Extensions). A Base-64 data stream is a stream of 6-bit numbers represented by an alphabet of 64 alphanumeric characters (usually the uppercase letters A–Z, the lowercase letters a–z, the digits 0–9, and the characters '+' and '/'. For our purposes, we use a modified Base-64 wherein '–' and '_' are used in place of '+' and '/' so as to generate HTTP compliant URL's.

Before it is encoded into modified Base-64 for transmission using HTTP, the session token has the format shown in Table 2.

TABLE 2

Web Session Token Format

| Bytes | Description |
|---|---|
| 1 | Token Format ID |
| 8 | Session Identifier |
| 2 | Length (N) of data to follow |
| N | Session Data |
| 4 | CRC Checksum (32 bit) |

The Token Format ID should be zero. This field is reserved as a way to specify new token formats should there be a need to change them in the future. The session identifier is a 64-bit ID comprising 16 bits (2 bytes) for a server node ID and 48 bits (6 bytes) for a unique session ID for the server node. This assumes a cooperating network of 2^16 servers or fewer each assigned a unique server node ID. The N bytes of session data is encrypted with target server node's public key and digitally signed with source server node's private key. Encryption is done using a public key cryptosystem supplied by RSA Data Security, of Palo Alto, Calif., or similar cryptosystem.

Before the session data is encrypted and signed, it has the following format, which is very similar to the RFC 822 electronic mail header format:

<KEY1>: <VALUE1>
<KEY2>: <VALUE2>
...
<KEYM>: <VALUEM>

In this format, a key and its associated value are separated by a colon (and optional whitespace) and key/value pairs are separated by newline characters. An example of session data is as follows:

Version-Date: Fri Dec 30 10:14:46 PST 1994
User-ID: Fred
Email-Address: fred@fred.org
Telephone: @123.Fred.Telephone
Postal-Address: @123.Fred.Address The "Telephone:" key value, "@123.Fred.Telephone", is an indirect reference to session information which indicates that Fred's telephone number is actually held at server node 123 and should be queried from that server node, using the data identifier "Fred.Telephone". To implement the out-of-band transferal of session information, a simple transfer protocol for making queries over a secure out-of-band channel is used. The secure out-of-band channel (depending upon the circumstances) may be implemented as a private, dedicated physical link (such as a dedicated, private T1 line), or may be implemented as a secure link over a public network using an encrypted tunnel (such as with SSL, Secure Sockets Layer).

A querying server node wishing to obtain session information from a source server node would simply open a connection with the source server node, identify itself (the querying server node), get authenticated and then make a set of queries to obtain session data. The following is an example of the process where a querying server node (identified as server node 456 in this example) connects to a source server node (identified as server node 123) to request out-of-band data:

| Server | Output |
|---|---|
| 123 | Connected to server 123, please identify and authenticate self |
| 456 | Server: 456 |
| | Signature REOp5XtI5XtIpWx1tBY6maOwRXuyNz |
| 123 | Server 456 authenticated, please make your requests. |
| 456 | Fred.Telephone, Fred.Address |
| 123 | Fred.Telephone: (345) 555-1212 |
| | Fred.Address: 12345 Main Street |
| | Anytown, USA 98765-1234 |
| 456 | QUIT |
| 123 | Goodbye, server 456. |

In addition to the above-described applications, other applications can be found for the present invention. One use of transparent session migration is a child filter. If a child is logged into a service, that child may see different information than if an adult were logged into the same service. As the child migrates from server to server, an indication that the user is a child will be included in the session information so that the target server node can adjust its content accordingly.

The above detailed description explains how to make and use a session migration method and apparatus according to the present invention. The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. In a client-server network having multiple independent servers, a method of session migration from a session between a client and a first server to a session between the client and a second server;

establishing a current session between the client and the first server after the first server has verified that the client is an authorized client of the first server;

sending a migration request from the client to the first server;

in response to the migration request generating a session token;

sending a session token from the first server to the client, wherein the session token uniquely identifies the current session between the client and the first server;

sending the session token from the client to the second server as a request to the second server for migration;

verifying, at the second server and from the session token, the identity of the client and the first server;

requesting, from the first server, data about the session, wherein the request is sent from the second server;

responding from the first server to the request for data by sending the requested data to the second server; and if the client is an authorized client with respect to the second server, continuing the session with the second server in place of the first server.

2. The method of claim 1, wherein the client-server network is the Internet and the first and second servers are hypertext transfer protocol servers.

3. The method of claim 1, wherein the step of generating a session token is a step of generating an encrypted session token.

4. The method of claim 3, wherein the step of generating an encrypted session token comprises the steps of encrypting portions of the session token and including a digitally signed portion in the session token, the digitally signed portion being digitally signed by a private key of the first server.

5. The method of claim 1, wherein the step of sending a session token from the first server to the client is a step of sending a session token containing a digitally signed portion, the digitally signed portion being digitally signed by a private key of the first server.

6. The method of claim 1, further comprising the steps of:

requesting a password from the client;

sending the password to the first server;

if the password matches a predetermined criterion indicating an authorized client, continuing with the step of establishing a session;

sending, as part of the session token, an indication from the first server, that the client is an authorized client; and using the indication from the first server as a substitute for a logon procedure used by the second server to verify the authorization of the client.

7. The method of claim 1, further comprising a step of forming a uniform resource locator representing the session token.

8. The method of claim 1, wherein the step of generating the session token is performed without a central token repository yet is guaranteed to be a unique session token.

9. The method of claim 1, further comprising a step of transferring the requested data using a protocol other than a hypertext transfer protocol.

10. The method of claim 1, further comprising a step of maintaining a version control number and requesting from the first server data which is an update to data received previously at the second server, the update being an update from a previous version of the data identified by a version number stored on the second server and a current version of the data identified by a version number stored on the first server.

11. The method of claim 1, wherein the session migration is from one World Wide Web server to a second World Wide Web server, and the client is a World Wide Web browser.

12. The method of claim 1, wherein each step of sending a session token comprises sending at least a part of the session token in a uniform resource locator.

13. The method of claim 1, wherein each step of sending a session token comprises sending at least a part of the session token in a hypertext transport protocol cookie.

* * * * *